(12) United States Patent
Cobarrubia

(10) Patent No.: US 7,904,356 B1
(45) Date of Patent: Mar. 8, 2011

(54) ICON BASED DATA MANAGEMENT

(75) Inventor: Mark A. Cobarrubia, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 589 days.

(21) Appl. No.: 11/328,803

(22) Filed: Jan. 10, 2006

(51) Int. Cl.
G06Q 40/00 (2006.01)

(52) U.S. Cl. .......................................... 705/31; 705/36 T

(58) Field of Classification Search ............... 705/26, 705/35, 36 R, 37, 40, 31, 36 T
See application file for complete search history.

(56) References Cited

U.S. PATENT DOCUMENTS

| | | | |
|---|---|---|---|
| 7,257,553 B1 * | 8/2007 | Baker | 705/31 |
| 7,565,312 B1 * | 7/2009 | Shaw et al. | 705/31 |
| 7,742,958 B1 * | 6/2010 | Leek et al. | 705/31 |
| 2002/0091602 A1 * | 7/2002 | Stern et al. | 705/35 |
| 2002/0133410 A1 * | 9/2002 | Hermreck et al. | 705/19 |
| 2003/0036912 A1 * | 2/2003 | Sobotta et al. | 705/1 |
| 2003/0182230 A1 * | 9/2003 | Pessin | 705/39 |
| 2005/0038722 A1 * | 2/2005 | Throndson et al. | 705/31 |
| 2006/0010050 A1 * | 1/2006 | Dowdell | 705/31 |
| 2006/0271451 A1 * | 11/2006 | Varughese | 705/31 |
| 2007/0033116 A1 * | 2/2007 | Murray | 705/31 |
| 2007/0033117 A1 * | 2/2007 | Murray | 705/31 |
| 2007/0033130 A1 * | 2/2007 | Murray | 705/36 T |

OTHER PUBLICATIONS

Multi-State Income Taxes Filed Online with Federal Returns Is New, Exclusive Feature of TaxBrain.com for 2006 Business Wire. New York: Dec. 27, 2005. p. 1.*
PPC—Federal Tax Compliance Service Anonymous. CPA Technology Advisor. Ft. Atkinson: Jan.-Mar. 2006. vol. 16, Iss. 1; p. 14, 1 pgs.*
New York: Income Tax: E-File Mandate for Tax Preparers Announced Anonymous. State Tax Review. Chicago: Jan. 4, 2006. vol. 67, Iss. 1; p. 15, 1 pgs.*

* cited by examiner

Primary Examiner — Hani Kazimi
(74) Attorney, Agent, or Firm — Osha • Liang LLP

(57) ABSTRACT

A financial computer program includes an icon representing a financial circumstance within the financial computer program, where the icon is selectable by a user to indicate the financial circumstance relevant to the user and manipulatable by the user to support a financial operation, data associated with the icon, and a software module configured to perform the financial operation at least partly dependent on the data associated with the icon.

17 Claims, 4 Drawing Sheets

ICON BASED DATA MANAGEMENT

BACKGROUND

An icon, in the context of computer technologies, is an image or picture, usually small in size, that represents a specific object, function, or program. Icons are prevalent in window-based computer operating systems and graphical user interface (GUI) based computer programs. A GUI is a user interface for a computer program that takes advantage of the computer's graphics capabilities to make the program easier to use.

For example, there is a picture of a trash bin on the background screen, or the desktop, of almost all versions of the Microsoft Windows, where the deleted files are temporarily stored until they are permanently removed from the computer system. This picture of a trash bin is an icon. When a user activates this icon, usually by moving the cursor on top of the icon and double clicking it, a window pops up, listing the deleted files as well as giving the user several options as to what to do with the deleted files. The user may choose to restore or undelete a specific file, or to alternatively permanently remove a file from the computer system.

A computer program may be represented within an operating system by an icon. When such a program icon is activated, usually by moving the cursor on top of the icon and double clicking it, the computer program the icon represents begins to execute or run.

Icons are used within GUI-based computer programs as well. For example, many computer programs use a picture of a printer to represent a "print" function. Typically, when the print icon is activated, the document, web page, or image the program is presently displaying is sent to a printer to be printed. Optionally, a window may pop up, permitting the user to specific parameters for the print function, such as which printer to use, the orientation of the paper, or which pages and how many copies to print.

SUMMARY

In general, in one aspect, the present invention involves a financial computer program. The financial computer program comprises an icon representing a financial circumstance within the financial computer program, wherein the icon is selectable by a user to indicate the financial circumstance relevant to the user and manipulatable by the user to support a financial operation, data associated with the icon, and a software module configured to perform the financial operation at least partly dependent on the data associated with the icon.

In general, in one aspect, the present invention involves a computer readable medium. The computer readable medium comprises software instructions to display an icon representing a financial circumstance, wherein the icon is associated with data and is selectable by a user to indicate the financial circumstance being relevant to the user and manipulated by the user to support a financial operation, and perform the financial operation at least partly dependent on selection of the icon.

In general, in one aspect, the present invention involves a method. The method comprises representing a financial circumstance using an icon selectable by a user to indicate the financial circumstance being relevant to the user and manipulatable by the user to support a financial operation, activating use of data associated with the icon dependent on selection of the icon, and performing the financial operation at least partly dependent on the data.

In general, in one aspect, the present invention involves an application program interface (API). The API comprises executable code for generating an icon representing a financial circumstance, wherein the icon is selectable and manipulatable by a user, obtaining input from an input field, wherein the user enters data associated with the icon via the input field, and performing a financial operation at least partly dependent on the data, wherein the financial operation is performed upon manipulation of the icon by the user.

Other aspects of the invention will be apparent from the following description and the appended claims.

DETAILED DESCRIPTION

Figure 1:
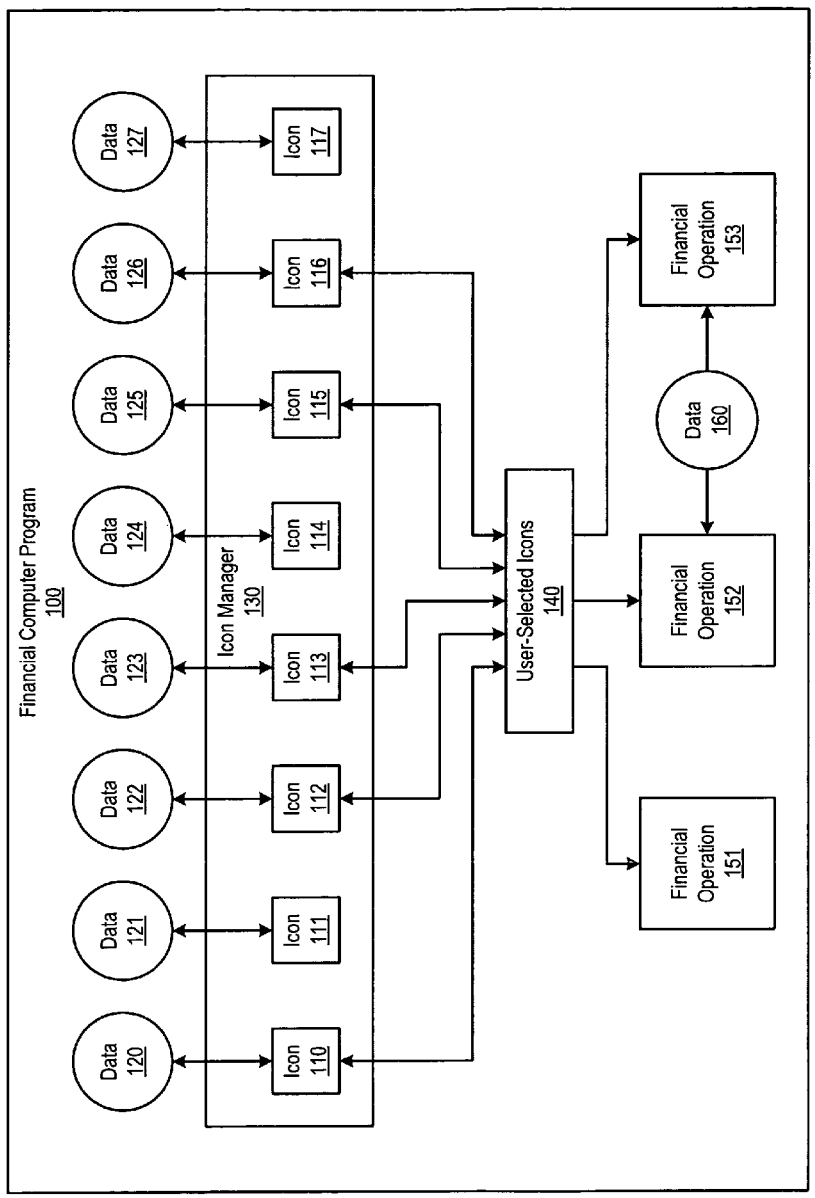
FIG. 1 shows an implementation of a system in accordance with one or more embodiments of the invention.

Exemplary embodiments of the invention will be described with reference to the accompanying figures. Like elements in the figures are denoted by like reference numerals for consistency.

In the exemplary embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a system and a method for representing data associated with an object by an icon within a financial computer program. The data is relevant to or used by the financial program.

A user of the financial program selects one or more icons from the list that apply to their circumstances. For each icon selected, the user optionally enters or modifies at least a portion of the data associated with the object represented by the selected icon. Functionality provided within the financial computer program utilizes one or more portions of the user-provided data in order to perform tasks.

In general, many different types of financial computer programs exist, including tax programs, accounting programs, etc. Each of those programs employ functionality relevant to the tasks they perform in the financial areas in which they focus. For example, tax programs employ functionality to prepare and file tax returns. Accounting programs include functionality to perform accounting tasks. In one aspect of the invention, icon-represented objects associated with data are utilized within a financial computer program facilitating both accounting and tax processes.

In order to complete the various tasks, the programs need data that are related to that user and the particular task. For example, in order to prepare a tax return for a given tax year for a taxpayer, the tax program needs taxpayer data regarding income earned during the tax year, mortgage interest paid during the tax year, the amount and type of tax deductible expenses that apply to the tax year, etc. In one or more embodiments of the invention, one or more of those required data items are associated with objects represented by icons.

FIG. 1 shows a portion of a financial computer program in accordance with one or more embodiments of the invention. A financial computer program (100) contains a standard list of icons (110, 111, 112, 113, 114, 115, 116, 117), and one or more of these icons represents an object that contains data (120, 121, 122, 123, 124, 125, 126, 127) relevant to or used by the financial computer program (100) for performing its operations.

In one embodiment of the invention, the financial computer program (100) is tax preparation software that facilitates one or more of the preparation of and filing of tax returns for taxpayers. As persons of ordinary skill in the art are readily aware, tax returns are filed with a tax authority, often together with any tax payments owed to that tax authority.

A tax authority includes, but is not limited to the Internal Revenue Service or other federal government tax authority, and State taxing authorities such as the California Franchise Tax Board, or other state or local government tax authority. The tax return may relate to income tax, or may instead relate to payroll tax or any other taxes regularly collected by tax authorities. The tax return may relate to income tax, or may instead relate to payroll tax or any other taxes regularly collected by tax authorities.

As an example, an icon (110) is associated with an object that represents a taxpayer. The data (120) associated with this icon (110) optionally includes one or more of the taxpayer's name, address, social security number, marital status, tax filing status, etc. A second icon (111) optionally represents a dependent of the taxpayer. The data (121) associated with this icon (111) optionally includes one or more of the dependent's name, social security number, date of birth, etc.

Other icons (112, 113, 114) optionally represent individual objects associated with certain data (122, 123, 124), including the taxpayer's employer information (wages paid, etc.), a W-2 form for the tax year, taxpayer investment data, alimony or spousal support, employee tax credit, disability information, etc. Other icons may be employed within the financial computer program (100) which represent objects containing relevant data, based on the requirements of the system designers.

In another example, the financial computer program (100) includes functionality that facilitates and performs tasks associated with accounting. In such accounting software, icons represent objects associated with portions of data need to perform one or more accounting-related tasks.

For example, in one or more embodiments of the invention, an icon (115) represents an object associated with data (125) regarding a bank account. Data associated with that bank account object may include one or more of the name and address of the bank, the type of account, such as checking, saving, or Certificate of Deposit (CD), the account number, etc.

According to one embodiment of the invention, other icons present in accounting software are optionally associated with accounts receivable, and accounts payable, and other accounting areas that may be desirable to systems designers and users.

In one or more embodiments of the invention, the icons (110, 111, 112, 113, 114, 115, 116, 117) maintained by the financial computer program (100) and the objects they represent are related to the types of data required by the financial computer program (100).

In one example, tax preparation functionality embedded in the financial computer program (100) includes objects relating to the taxpayer's income, deductions, tax credits, etc. Correspondingly, accounting functionality, if employed, embedded in the financial computer program (100) includes objects relating to the user's expenses, profits, payment schedules, and etc. Finally, estate planning functionality, if employed, embedded in the financial computer program (100) includes objects relating to one or more of the testator's personal property and the testator's real property, one or more person's or organizations designated to receive the legacy, etc.

In one or more embodiments of the invention, the character of various data (125, 126, 127) associated with data objects represented by icons (115, 116, 117) maintained by the financial computer program (100) are determined based on characteristics that are expected to be prevalent among likely users of the financial computer program (100). Such a determination maybe made through market research or other means.

As an example, a provider of a financial computer program (100) performs a survey of consumers listed within their customer base, or alternatively perform telephone surveys of various members of the population at large. The surveys may determine characteristics that are relatively common among those consumers, and that certain groups of consumers within the surveyed individuals are more likely to use or be the subjects of the financial computer program (100). As a result, the financial computer program (100) may have icons representing objects associated with data related to one or more of those relatively common characteristics, as determined by the survey or other market research.

In the example given in the above embodiment of the invention where the financial computer program (100) is a tax preparation software, maybe only a very small percentage of the program's (100) users own farms, and thus, the tax program (100) may choose not include an icon that represents a farm. Instead, if a user actually owns a farm, he/she can enter data relating to the farm via other types of user interface.

There may be more common characteristics than are desired or are relevant to the operations performed by financial computer program (100). The actual number and character of icons displayed and the number of data objects being represented may be determined according to customer research, system needs, and the availability of computing system resources.

For data that that isn't represented by icons, data may be entered for these objects by other means, such as through answering questions or filling in one or more forms that a user selects from a list.

In one or more embodiments of the invention, the financial computer program (100) arranges the icons (110, 111, 112, 113, 114, 115, 116, 117) in its user interface in an order corresponding to the likelihood of use according to surveys or market research mentioned previously. In one or more embodiments of the invention, in a user interface of the financial computer program (100), icons that represent those objects that apply to a greater number of likely users are listed first, followed by the icons that represent those objects that apply to fewer likely users.

In one embodiment of the invention, in a user interface of the financial computer program (100), the icons that represent those objects that apply to more likely users are visible with higher frequency than icons that represent those objects that apply to fewer likely users are visible only after a specific action is performed, such as clicking a button or expanding a window.

In one or more embodiments of the invention, the financial computer program (100) arranges the icons (110, 111, 112, 113, 114, 115, 116, 117) in its user interface in alphabetical order based on icon or object names.

In one or more embodiments of the invention, an icon manager (130) manages the icons (110, 111, 112, 113, 114, 115, 116, 117). The icon manager (130) maintains a collection or list of commonly used icons contained in the financial computer program (100), and enables the selection of icons, to enter or modify the data that are associated with an object represented by icon, deselect an icon, etc., as desired.

The concept of icons may be extended beyond representing objects that contain data. In one or more embodiments of the invention, at least one icon represents at least one operation provided by the financial computer program. For example, with the tax preparation software described above, one icon (not shown) may represent an electronic tax return filing operation. Another icon (not shown) may represent an estate planning operation. As with icons that represent data objects, icons representing operations may be selected or deselected by a user of the software, as desired.

The selection and deselection of icons optionally take place through a GUI. In one or more embodiments of the invention, a user uses a computer mouse to select an icon by moving a cursor on top of the icon and clicking the mouse. To deselect the icon, the user clicks the highlighted icon again and the icon is not highlighted.

In one or more embodiments of the invention, a user moves the cursor on top of the icon image. The user clicks the mouse button and drags the icon to a specific place or window while holding the button down. The user releases the mouse button to place the icon at the destination window. This process is known as "drag and drop". The icons within in the specific place or window are selected. The deselect, the user drags the icon away from the place or outside of the window.

There are different methods to enter data into a computer program. In one or more embodiments of the invention, if the user activates an icon, such as by moving the cursor on top of the icon and double-clicking it, a window opens, displaying data entries that correspond to data associated with a data object represented by the activated icon. Data may be entered, deleted, and modified through this window.

In one or more embodiments of the invention, the financial computer program (100) keeps track of which icons have been selected by the user. In one embodiment of the invention, the financial computer program (100) maintains a list of icons (140) previously selected by a user. The list of icons (140) keeps track of which icons from a standard list of icons (110, 111, 112, 113, 114, 115, 116, 117) offered by the financial program have been selected by the user at any given time. The user may modify this list of icons (140) at any time. For example, the user may add icons to the list (140) or remove icons from the list (140).

In the example described earlier where the financial computer program (100) is tax preparation software, a taxpayer optionally selects one or more icons that represent themselves (110), their wages (112), their investment income (113), the mortgage interest they have paid (115), and the tax credit from their household employee's wages (116). The taxpayer need not select any icons that do not apply to them, such as a dependent icon (111), an alimony payment icon (114), and an icon representing tax credit for the disabled or elderly (117).

Correspondingly, a user of the financial computer software (100) need only enter one or more portions of data that are associated with those icons that he/she has selected, leaving other data areas empty. In the example given above, where the financial computer program (100) is tax preparation software, the taxpayer need only enter data associated with the selected icons (120, 122, 123, 125, 126).

In one embodiment of the invention, the data associated with a particular icon includes a selection indicator that indicates whether that particular icon has been selected by the user. In this embodiment, a centralized collection of selected icons is not needed, since the selection indicator associated with each icon provides the needed indication as to whether the given icon has been selected. In one or more embodiments of the invention, the financial program (100) displays the user-selected icons (140) in its user interface so that a user may know which icons have been selected.

In one embodiment of the invention, user-selected icons (140) are arranged in groups, where icons belonging to the same category are grouped together. In the example given in the above embodiment of the invention where the financial computer program (100) is tax preparation software, icons that represent various types of income for the taxpayer are grouped together, icons that represent various types of deductions are grouped together, and icons that represent various types of tax credits are grouped together. In one embodiment of the invention, the user-selected icons (140) are arranged in alphabetical order.

In one or more embodiments of the invention, the financial computer program (100) performs one or more financial operations (151, 152, 153) for the user. The user selects several financial operations (151, 152, 153) to be performed together, or select one operation to be performed at a time. One or more such financial operations (151) may use data associated with one or more of the user-selected icons (140) to obtain results. One or more operations (152, 153) may use other data (160) in addition to data associated with the user-selected icons (140) to obtain results. If the user modifies the list of user-selected icons (140) or the data associated with the user-selected icons (140), the financial operations (151, 152, 153) may be performed again to reflect the changes made by the user and obtain different results.

In the example given in the above embodiment of the invention where the financial computer program (100) is tax preparation software, a financial operation (152) example includes calculating the federal tax owed for the user. The calculation is based on data associated with the user-selected icons (140) and previously entered data, such as wages, investment dividend, mortgage interest, etc, as well as other forms of data (160) also maintained by the financial program (100) which is not associated with an icon. Such other data (160) may include, and is not limited to, one or more of the federal tax rate, a tax table, a standard deduction amount per person, an alternate minimum tax, etc.

Figure 2:
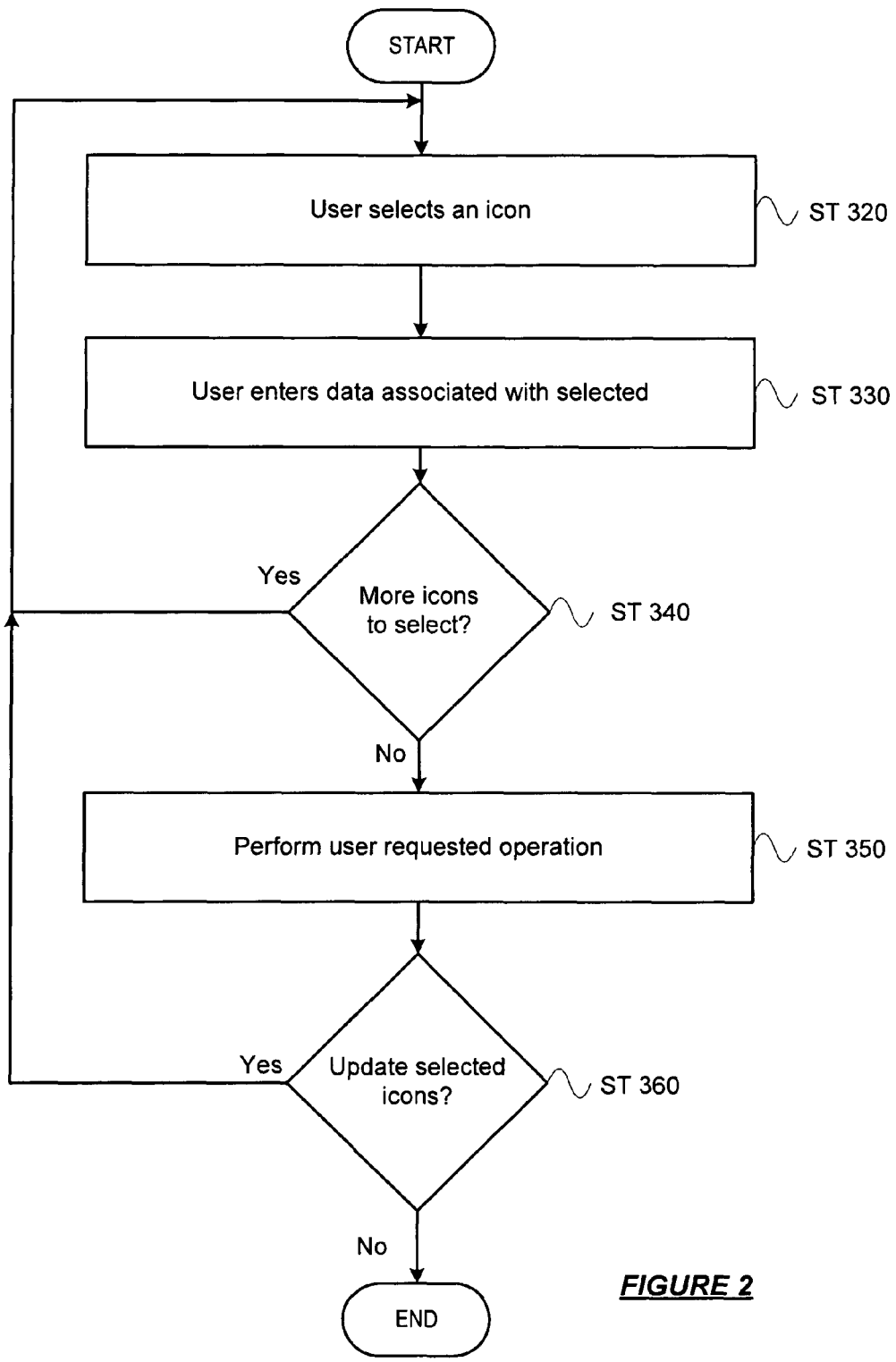
FIG. 2 shows a flowchart of a method in accordance with one or more embodiments of the invention.

FIG. 2 shows a flowchart of a method in accordance with one or more embodiments of the invention. In one embodiment of the invention, a user of a financial computer program selects an icon (e.g., icon 112 of FIG. 1) from a list of icons maintained by the program (ST320). The user inputs at least a portion of the data associated with the selected icon (ST330). A determination is made of whether the user wishes to select additional icons (ST340). If yes, the methods proceeds again (ST320). If not, the user may request the financial computer program to perform a specific financial operation (ST350). To achieve the desired results of the operation, the financial computer program (100 of FIG. 1) optionally uses at least a portion of the data associated with one or more of the user-selected icons At any given time, the user may modify the user-selected icons or data associated with the selected icons. In one embodiment of the invention, after the program finishes performing the requested operation, the user updates (ST360) the list of user-selected icons (140 of FIG. 1). Updating the list of icons includes one or more of adding additional icons, removing icons that are no longer desired, or adding, modifying or deleting data associated with one or more of the selected icons.

Once the user has updated the list of selected icons, the user may request the program to perform the financial operation again to obtain new results based on the modified data.

It is not necessary that the user enters data associated with an icon immediately after the user has selected that icon. The user may select all the desired icons before entering data associated with each selected icon. The user may optionally select one or more icons, enter data for all or a subset of those selected icons, and then select additional icons. Persons of ordinary skill in the art having the benefit of this disclosure will readily recognize that other orders of steps are possible, while remaining within the scope and purpose of this disclosure.

One or more embodiments of the invention may be implemented on virtually any type of computer system regardless of the platform being used. For example, a financial computer program employing the invention may be a single standalone computer may alternatively be a client computer connected to a networked server.

Figure 3:
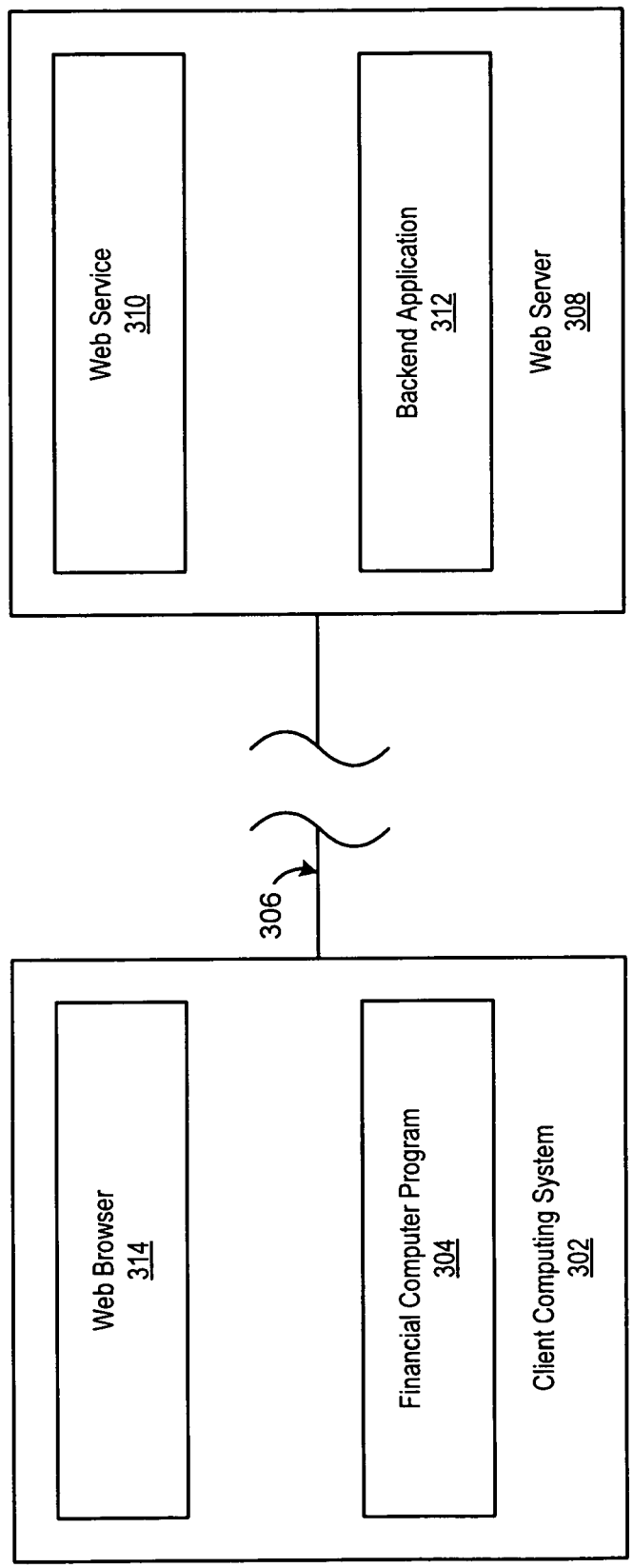
FIG. 3 shows a block diagram in accordance with one or more embodiments of the invention.

FIG. 3 is a block diagram according to one or more embodiments of invention. A client computing system (302) includes a financial computer program (304) employing the invention. In one embodiment of the invention client computing system (302) is a stand-alone computing system, and the financial computer program (304) optionally employs functionality to exchange information with other computer systems as necessary. In one embodiment of the invention, the client computing system (302) is coupled through transmission lines (306) to a web server (308).

The Web server (308) optionally includes a Web service (310) and includes a backend application (312) which together include functionality for performing one or more financial application operations and for performing one or more tasks required for communication between the web server (308) and the client computing system (302). In one embodiment, the backend application (312), the Web service (310), and the financial computer program (304) together provide the functionality required to perform the methods and operations described herein.

In one embodiment, the Web service (310) and the backend application (312) together comprise all of the functionality necessary to employ the invention, in which case the client computing system (302) optionally includes financial computer program (304), but does include one or more software applications employing network connectivity software able to view operate with an otherwise interact with files stored elsewhere on a network. One example of such a software application is a Web browser (314) that interacts with the Web service (310), which, in turn, interacts with the backend application (312) having functionality to perform methods according to the present invention.

One of ordinary skill in the art will readily recognize that the client computing system (302) and the web server (308) may be connected in a variety of ways while remaining within the scope and purpose of this invention. For example, a network employing the present invention may be a combination of different networks. Further, communication between the client computing system (302) and the web server (308) may take place over wired (including fiber optics) networks and systems, or may alternatively take place using wireless communication.

Figure 4:
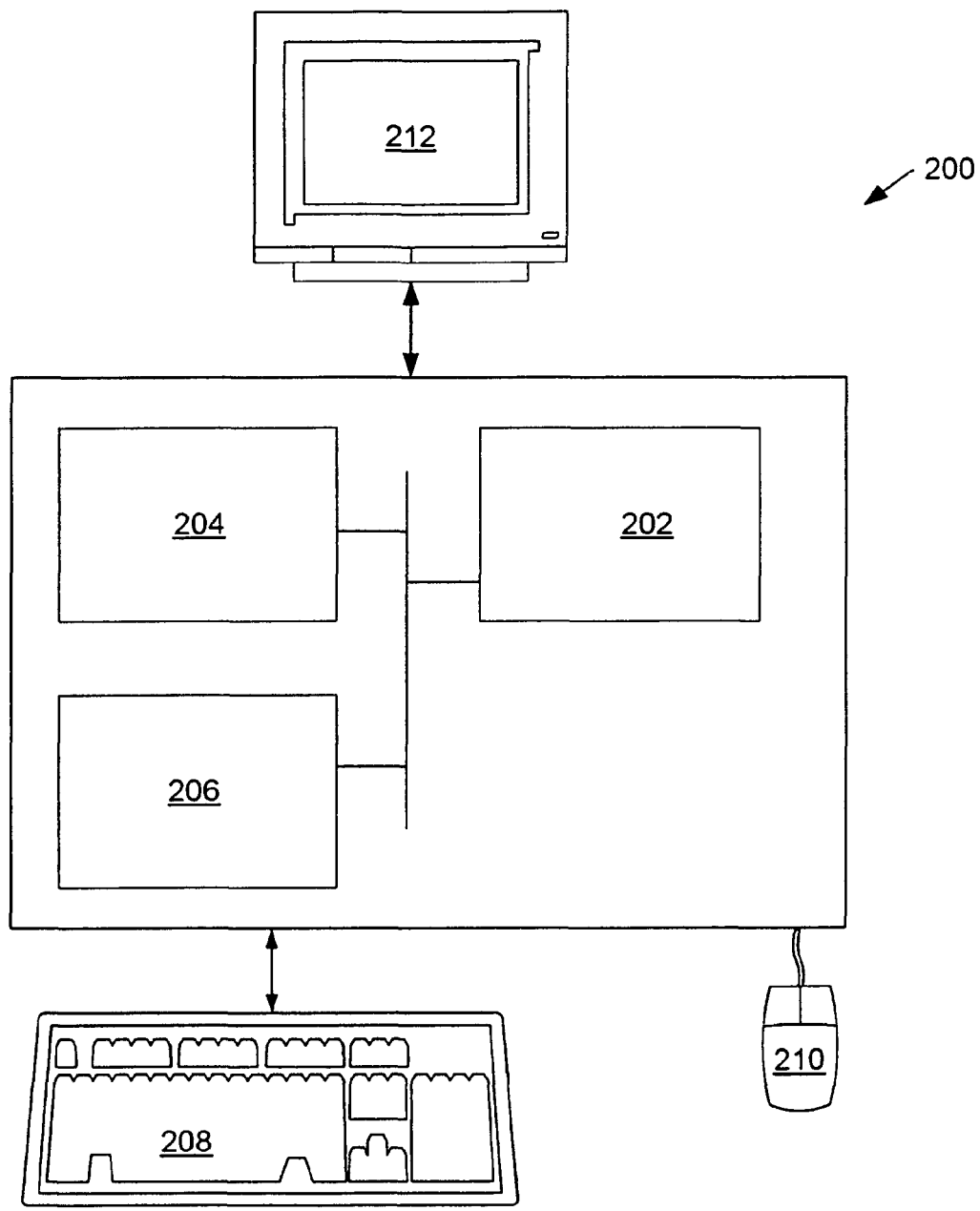
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system (200) includes at least one processor (202), associated memory (204), a storage device (206), and numerous other elements (not shown) and functionalities typical of modern computer systems. The networked computer system (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the networked computer system (200) may be remotely located and connected to the other elements over a network. Further, software instructions to perform one or more embodiments of the present invention may be stored on a computer readable medium such as a compact disc (CD), a diskette, a tape, a file, a hard drive, or any other computer-readable storage device.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A system for preparing a tax document, comprising:
   a computing device comprising a processor to execute a financial computer program (FCP) with functionality to:
   display, in a first window of the FCP, a plurality of icons corresponding to a plurality of tax categories;
   receive, from a user of the FCP, a first request to move a first icon of the plurality of icons, wherein the first icon corresponds to a first tax category of the plurality of tax categories;
   move, in response to the first request, the first icon from the first window to a second window of the FCP;
   receive, from the user, a first taxpayer data relating to the first tax category after moving the first icon;
   receive, from the user, a second request to move a second icon of the plurality of icons, wherein the second icon corresponds to a second tax category of the plurality of tax categories;
   move, in response to the second request, the second icon from the first window to the second window;
   receive, from the user, a second taxpayer data relating to the second tax category after moving the second icon;
   arrange, in the second window and by the FCP executing on the processor, the first icon into a first group corresponding to the first tax category and the second icon into a second group corresponding to the second tax category;
   calculate, by the FCP, a tax owed by the user based on the first taxpayer data and the second taxpayer data;
   populate by the FCP, the tax document with the tax owed; and
   transmit the tax document to a tax authority; and
   a storage device configured to store the first taxpayer data and the second taxpayer data.

2. The system of claim 1, further comprising:
   a graphical user interface comprising the plurality of icons.

3. The system of claim 1, further comprising:
   an icon manager configured to manage the first request and the second request based on user input.

4. The system of claim 3, further comprising:
   a user-selected icon list, wherein, responsive to the user, the icon manager is further configured to add the first icon and the second icon to the user-selected icon list.

5. The system of claim 3, further comprising:
a selection indicator configured to indicate that the first icon and the second icon are selected by the user.

6. The system of claim 1, wherein the FCP further comprises functionality to request taxpayer data from the user after moving the first icon and the second icon.

7. The system of claim 1, wherein at least a portion of the first taxpayer data is predetermined.

8. A computer readable medium, comprising software instructions executable on a processor with functionality to prepare a tax document, the software instructions comprising executable code for:
displaying, in a first window of a financial computer program (FCP), a plurality of icons corresponding to a plurality of tax categories;
receiving, from a user of the FCP, a first request to move a first icon of the plurality of icons, wherein the first icon corresponds to a first tax category of the plurality of tax categories;
moving, in response to the first request, the first icon from the first window to a second window of the FCP;
receiving, from the user, a first taxpayer data relating to the first tax category after moving the first icon;
receiving, from the user, a second request to move a second icon of the plurality of icons, wherein the second icon corresponds to a second tax category of the plurality of tax categories;
moving, in response to the second request, the second icon from the first window to the second window;
receiving, from the user, a second taxpayer data relating to the second tax category after moving the second icon;
arranging, in the second window and by the FCP, the first icon into a first group corresponding to the first tax category and the second icon into a second group corresponding to the second tax category;
calculating, by the FCP, a tax owed by the user based on the first taxpayer data and the second taxpayer data;
populating, by the FCP, the tax document with the tax owed; and
transmitting the tax document to a tax authority.

9. The computer readable medium of claim 8, further comprising software instructions to:
display a graphical user interface (GUI) of the FCP comprising the plurality of icons.

10. The computer readable medium of claim 9, wherein the GUI further comprises the first icon and the second icon.

11. The computer readable medium of claim 8, further comprising software instructions to:
deselect each of the plurality of icons.

12. The computer readable medium of claim 8, further comprising software instructions to:
request taxpayer data from the user after moving the first icon and the second icon.

13. The computer readable medium of claim 8, further comprising software instructions to:
activate the first icon after moving the first icon; and
display a third window, wherein the third window comprises the first taxpayer data.

14. The system of claim 1, wherein the FCP further comprises functionality to:
receive feedback from a plurality of users of the FCP; and
assign a plurality of rankings to the plurality of tax categories based on the feedback.

15. The system of claim 14, further comprising:
arranging the plurality of icons in the first window according to the plurality of rankings.

16. The computer readable medium of claim 8, further comprising software instructions to:
receive feedback from a plurality of users of the FCP; and
assign a plurality of rankings to the plurality of tax categories based on the feedback.

17. The computer implemented method of claim 16, further comprising software instructions to:
arrange the plurality of icons in the first window according to the plurality of rankings.

* * * * *

UNITED STATES PATENT AND TRADEMARK OFFICE
CERTIFICATE OF CORRECTION

| | | |
|---|---|---|
| PATENT NO. | : 7,904,356 B1 | Page 1 of 1 |
| APPLICATION NO. | : 11/328803 | |
| DATED | : March 8, 2011 | |
| INVENTOR(S) | : Mark A. Cobarrubia | |

It is certified that error appears in the above-identified patent and that said Letters Patent is hereby corrected as shown below:

In Claim 1, Column 8 (line 54), a "," should be added after "populate".

Signed and Sealed this
Seventeenth Day of May, 2011

David J. Kappos
*Director of the United States Patent and Trademark Office*